United States Patent [19]

Treske

[11] Patent Number: 5,740,615
[45] Date of Patent: Apr. 21, 1998

[54] DEVICE FOR PUNCTURING AEROSOL CANS

[76] Inventor: Gustav Treske, 3860 Rose Park Dr., West Linn, Oreg. 97068

[21] Appl. No.: 815,799

[22] Filed: Mar. 12, 1997

[51] Int. Cl.⁶ ...................................................... B67B 7/48
[52] U.S. Cl. .................... 30/448; 30/443; 141/65
[58] Field of Search .................. 30/443, 448, 446, 30/447; 141/51, 65

[56] References Cited

U.S. PATENT DOCUMENTS

| | | | |
|---|---|---|---|
| 2,766,520 | 10/1956 | Sheperak | 30/448 |
| 2,936,521 | 5/1960 | Miller | 30/448 |
| 3,298,100 | 1/1967 | Walker et al. | 30/443 |
| 5,086,814 | 2/1992 | Sato et al. | 141/65 |
| 5,265,762 | 11/1993 | Campbell et al. | 30/448 |
| 5,271,437 | 12/1993 | O'Brien et al. | 141/51 |
| 5,275,214 | 1/1994 | Rehberger | 141/65 |
| 5,285,827 | 2/1994 | Gonzalez-Miller et al. | 141/65 |
| 5,332,009 | 7/1994 | Van Etten | 141/65 |
| 5,365,982 | 11/1994 | O'Neill | 141/51 |
| 5,441,088 | 8/1995 | O'Neill et al. | 141/51 |
| 5,499,665 | 3/1996 | Gold et al. | 141/65 |

FOREIGN PATENT DOCUMENTS 2 082 540  3/1982  United Kingdom ............... 30/448

*Primary Examiner*—Hwei-Siu Payer
*Attorney, Agent, or Firm*—Smith-Hill and Bedell

[57] ABSTRACT

A device for puncturing an aerosol can includes a receiver block defining a seat for receiving the aerosol can with its base downward against the seat. A pivot rod is fitted in the receiver block below the seat, and a tool bit attached to the pivot rod projects from the pivot rod into a passage extending downward from the seat. When the pivot rod is rotated in one direction, the tip of the tool bit moves upward along an arcuate path from a withdrawn position in which the can can be placed on the seat over the passage without interference with the tool bit, to a relatively extended position in which the tool bit extends upward of the seat and penetrates the base of the can.

7 Claims, 2 Drawing Sheets

DEVICE FOR PUNCTURING AEROSOL CANS

BACKGROUND OF THE INVENTION

This invention relates to a device for puncturing aerosol cans.

Aerosol cans are widely used for application of paint. The typical aerosol can used for this purpose has a cylindrical wall, a convex top equipped with a valve, and a concave base. The top and the base are each attached to the wall by a raised band or rim extending around the can. Aerosol cans for paint have several standard nominal sizes: 2 inch, 2.5 inch and 3 inch diameter. An aerosol paint can contains liquid paint and a propellant. The paint may comprise solids dissolved in a volatile solvent such a acetone or xylene. Acetone and xylene, and other paint solvents, are considered to be hazardous.

A paint can containing unused paint is also considered to be hazardous if the residue in the can is liquid, and accordingly disposal of used aerosol paint cans is subject to strict regulation. For example, in many jurisdictions regulations prohibit discarding an aerosol paint can that contains unused paint with other waste, because there is a significant possibility that the can will eventually lose its integrity and the solvents present in the can will escape into the environment.

Much of the material used in manufacture of an aerosol can is good quality steel. It has therefore been proposed that aerosol paint cans should be processed by removing any residual liquid and then recycling the cans to recover steel for reuse.

In order to remove residual liquid from an aerosol paint can, it is conventional to puncture the can so that its contents can drain from the can. When a can has been punctured and its contents drained, the can is tossed in a collection receptacle, and when the receptacle is full, the contents are crushed and the resulting block of steel and contaminants (such as plastic valves) is sent to a metal recovery plant for recovering the steel.

Various mechanisms have been proposed for puncturing an aerosol can. Mechanisms for puncturing an aerosol can generally pierce the can either through the side wall of the can or through the top. It is also known to puncture an aerosol can by piercing through the base of the can. Such known puncturing mechanisms suffer from disadvantages of various kinds. Specifically, a known mechanism that pierces a can through the base uses a piercing tool that moves upward along a linear path and penetrates the base near its center. Because the base is concave, there is an annular pocket around the base from which liquid cannot drain through the hole if the can is oriented vertically. Since the cans do not drain fully, they may still be considered to be environmentally hazardous due to the presence of solvents. In addition, the residual solvents may create a danger of fire or explosion when the cans are compressed. Further, as the tool penetrates the base, the pressurized liquid is forced through the gap between the tool and the periphery of the hole formed by the tool, and since the gap may be narrow, the can is not instantaneously depressurized and the liquid sprays from the can under the pressure of propellant in the can and may spray over the operator of the puncturing device, rendering the operation unpleasant and potentially hazardous.

U.S. Pat. No. 5,518,920 discloses a method and apparatus for biological treatment of hazardous waste, particularly volatile organic compounds (VOCs) of various kinds, including paint solvents, that are widely used in many industrial processes. In accordance with the disclosure in U.S. Pat. No. 5,518,920, VOCs in gaseous form are introduced into a chamber that contains a biologically active matrix including an organism which biologically converts the VOCs to carbon dioxide and water.

SUMMARY OF THE INVENTION

In accordance with the invention there is provided a device for puncturing an aerosol can having a base, comprising a receiver member defining a seat for receiving the aerosol can with its base downward against the seat, the receiver member being formed with a passage extending downward from the seat, a pivot rod fitted in the receiver member below the seat, a tool bit attached to the pivot rod and projecting from the pivot rod into the passage, such that when the pivot rod is rotated in a first sense a tip of the tool bit moves upward along an arcuate path from a relatively withdrawn position in which the can can be placed on the seat over the passage without interference with the tool bit, to a relatively extended position in which the tool bit extends upward of the seat and penetrates the base of the can.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTIONDetailed Description

Figure 1:
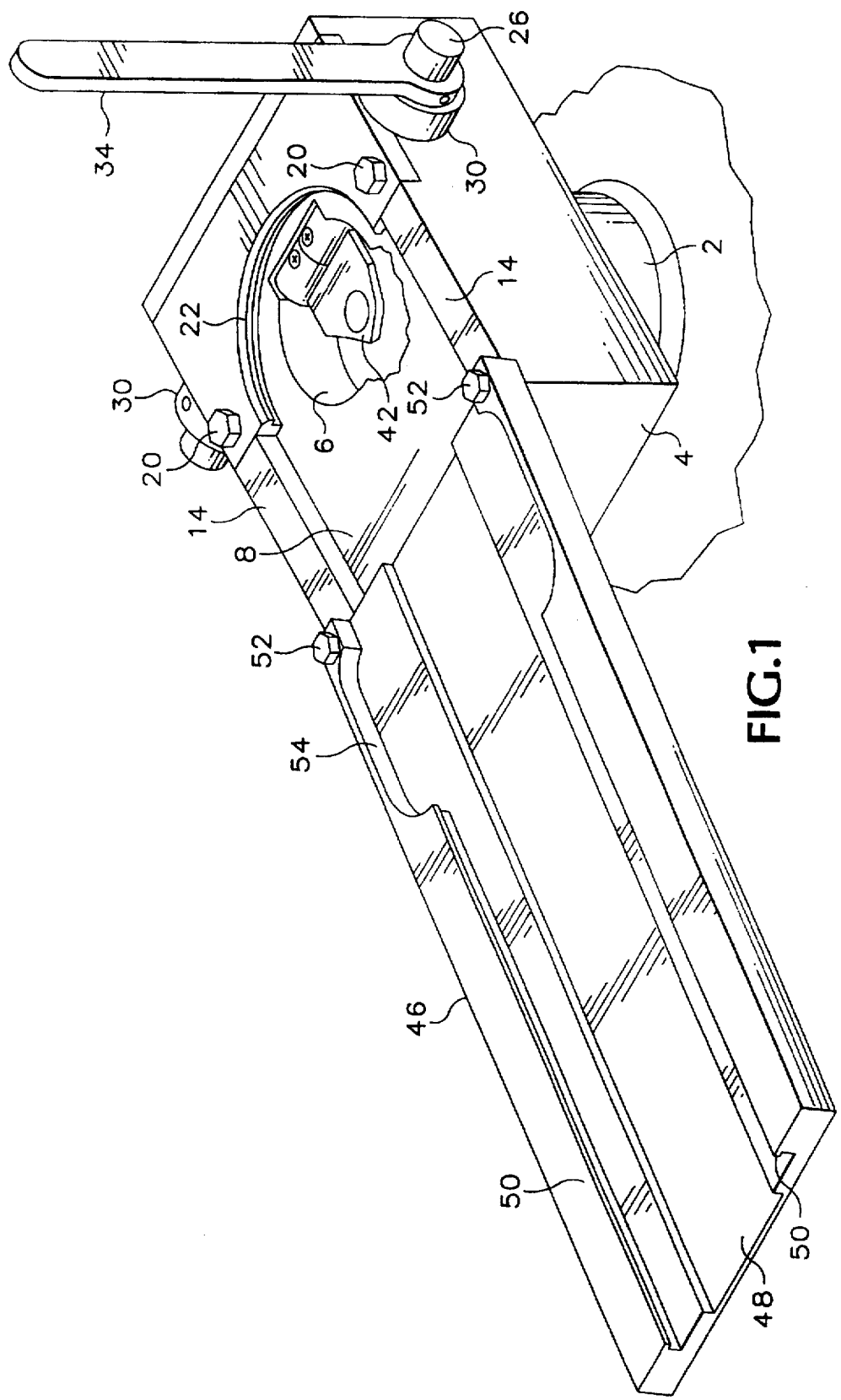
FIG. 1 is a perspective view of a device for puncturing aerosol cans.

The device that is illustrated in the drawings includes a tube 2 which is adapted to be screwed into the bung hole of an expansion tank, such as a 55 gallon drum. The expansion tank may have a second opening coupled to apparatus for biologically degrading VOCs, for example as described in U.S. Pat. No. 5,518,920. The expansion tank is oriented so that the tube 2 extends vertically upward from the tank.

A receiver block 4 is formed near one end with a cylindrical bore 6 extending downward from its flat upper surface 8. The receiver block is counterbored from below, and the upper end of the tube 2 is received in the counterbore. In this manner, the receiver block is mounted on the tube 2. The receiver block 4 is held in position on the tube 2 by means of a set screw 10.

A retainer plate 18 is attached to the flat upper surface 8 of the receiver block by bolts 20. The retainer plate has a semi-circular notch 22. The notch has an upper part of diameter corresponding to the diameter of one of the standard sizes of aerosol can and a lower part for accommodating the rim that is typically formed at the bottom of an aerosol can where the base is rolled over the wall of the can. Two walls 14 extend from the retainer plate toward the opposite end of the receiver block.

Figure 2:
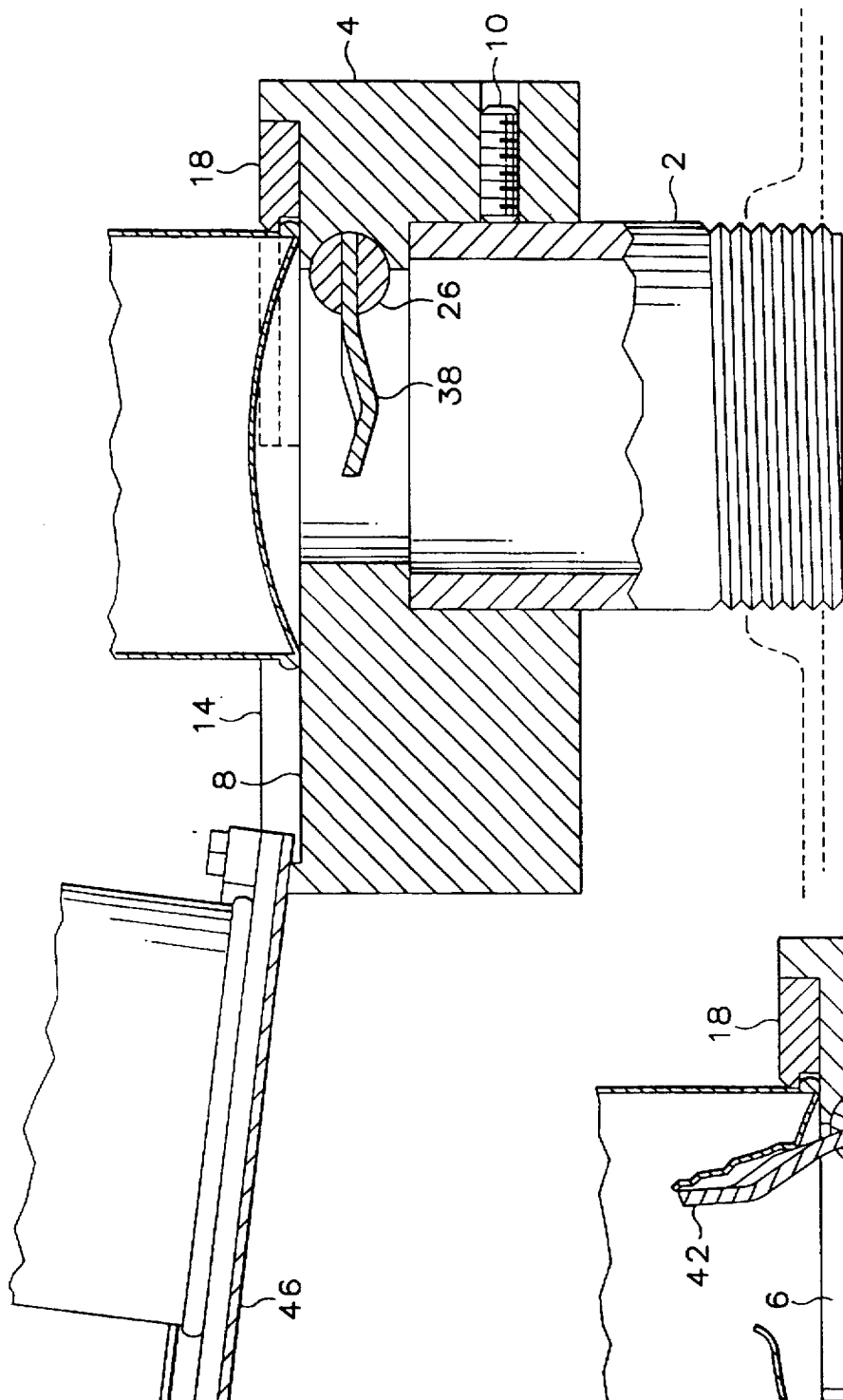
FIG. 2 is a sectional view of the device shown in FIG. 1 when a can has been positioned for puncturing.
Figure 3:
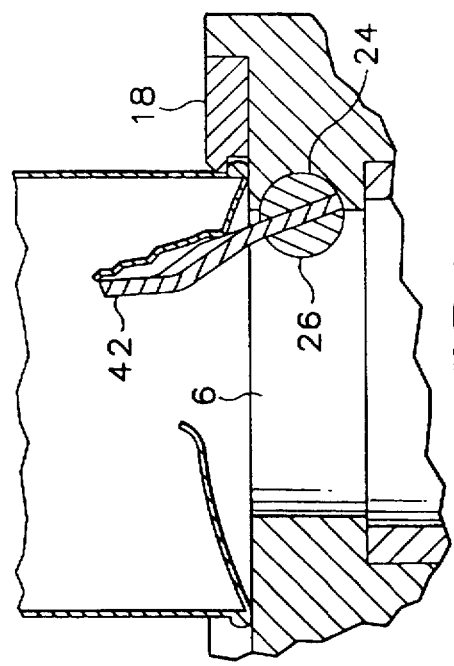
FIG. 3 is a partial sectional view after the can has been punctured.

Cans to be punctured are sorted by size and a can of a size corresponding to the diameter of the upper part of the notch 22 is positioned on the receiver block with its base resting on the flat surface 8 and its rim in the lower part of the notch 22 as shown in FIG. 2, so that by applying a force pulling the base of the can into the notch 22, the rim is firmly received in the lower part of the notch 22 and the can is held against upward movement relative to the receiver block.

The receiver block 4 is also formed with a horizontal bore 24 extending substantially tangentially relative to the vertical bore 6, and a shaft 26 is fitted in the horizontal bore 24 for rotation therein. The shaft 26 is restrained against axial movement relative to the receiver block 4 by collars 30 which are secured on the shaft 26 by respective set screws. The collars 30 allow pivotal movement of the shaft 26 relative to the receiver block 4. The ends of the shaft 26 project from the collars 30, and a handle 34 can be mounted on either end of the shaft and is secured on the appropriate end of the shaft 26 by means of a set screw. Generally, a right-handed operator will fit the handle to the far end of the shaft as seen in FIG. 1 whereas a left-handed operator will fit the handle to the near end of the shaft 26, as shown in FIG. 1. The operator's favored hand is used for operating the handle and the other hand is used to hold the can. A tool bit 38 is attached to the shaft 26 so that it projects laterally of the shaft 26 into the vertical bore 6 of the receiver block 4. The tool bit 38 has a mounting portion secured in a slot in the shaft 26 and a generally triangular cutting portion 42 projecting from the mounting portion and directed somewhat upwardly in the vertical bore when the mounting portion is disposed horizontally. Preferably, the shaft 26 is in two parts which are connected together end-to-end by the tool bit 38 being received partly in a half-slot in one part of the shaft and partly in a half-slot in the other part of the shaft, and secured in the two half-slots by screws.

A discharge track 46 having a length of about 60 cm is attached to the receiver block 4 at the end farther from the bore 6 using bolts 52 and slopes upwardly from the surface 8. A collection receptacle (not shown) is positioned beneath the free end of the track. The track 46 has a generally flat upper surface with a channel 48 formed therein and has in-turned flanges 50 projecting from its walls. The separation of the flanges 50 corresponds to the diameter of the cans to be processed. The flanges 50 are relieved at 54 to form a loading area.

In operation of the device shown in the drawings, the user grasps an aerosol can to be processed in his unfavored hand and positions the can with its base on the flat upper surface 8 of the receiver block 4, between the exit track 46 and the retainer plate 18, and slides the can to position the rim in the lower part of the notch 22 in the retainer plate. The operator holds the can in this position with his unfavored hand and applies torque to the handle 34 with his favored hand to rotate the shaft 26 in the clockwise direction seen in FIG. 2. The tip of the tool bit 38 moves upward along an arcuate path into the space beneath the concave bottom of the can and pierces the bottom of the can slightly nearer than the center of the base to the deepest part of the notch 22. As the operator continues to rotate the handle 24, the tool bit 38 continues along its arcuate path, away from the point at which it first pierced the base of the can. The tool bit 38 tears the base of the can and peels a generally triangular portion or tongue of the base back toward the wall of the can. In this fashion, an opening which extends almost as far as the periphery of the base is formed in the base of the can. When the opening is formed, the liquid contents of the can are at first forced out by any residual propellant and then drain out under gravity. The tool bit 38 does not obstruct flow of material from the can and the contents of the can are able to drain substantially fully because there is no pocket beneath the opening in which liquid material can remain.

When the operator has completed the movement of the handle 34 in the clockwise direction, he then pivots the handle 34 in the counterclockwise direction back to its previous position, and the tool bit 38 is withdrawn from the can and is positioned once more in the vertical bore 6 of the receiver block 4. The operator moves the punctured can out of engagement with the retainer plate 18 and places it on the loading area 54 of the exit track 46. This operation is repeated, and as the operator places each can on the loading area of the exit tract, he pushes the cans that were previously placed on the exit track toward the far end of the track while the flanges 50 stabilize cans on the exit track as they are pushed toward the end of the track. After about 10 or 15 more cans have been punctured and placed on the exit track, the can reaches the end of the track and falls from the exit track into the collection receptacle.

So long as the operator does not turn the can when moving it onto the exit track, the opening in the base of the can will be downhill from the center of the base as the can moves up the exit track and liquid will drain efficiently from the can while the can remains on the track. The liquid flows down the channel 48 in the exit track and passes through the vertical bore 6 into the drum. The speed at which an operator is able to process cans using the illustrated device is such that a can remains on the exit track for about one minute, which in most cases is sufficient for all liquid in the can, other than a film on the interior surfaces of the can, to drain from the can. Any solvent that remains in the liquid film evaporates fairly quickly, leaving a dry paint film that is not hazardous. The contents of the collection receptacle can then be crushed without danger of fire or explosion and the resulting block can be transported to a metal recovery location.

The paint or other liquid flows downward from the can through the vertical bore 6 into the drum, and the volatile solvents that accumulate in the drum may be drawn off through a secondary opening for biological treatment in the manner described in U.S. Pat. No. 5,518,920.

When the operator has finished processing a batch of cans of one size, he removes the retainer plate 18 and the exit track 46 that are adapted to that size of can and fits the retainer plate 18 and exit track 46 for another size to the receiver block 4 and processes the cans of that size. In each case, the notch 22 is positioned so that the tip of the tool bit 38 pierces the bottom of the can slightly closer than the center of the base to the portion of the rim that is closer to the shaft 26.

The configuration of the plate 18, with a small clearance around the rim of the can to be processed, ensures that a pool of paint cannot accumulate under the retainer plate 18. This is advantageous because if a pool were permitted to accumulate, it could be forced out of the clearance due to fluid under pressure entering the clearance from a can being processed and could spray over the operator.

It will be appreciated that the invention is not restricted to the particular embodiment that has been described, and that variations may be made therein without departing from the scope of the invention as defined in the appended claims and equivalents thereof.

What is claimed is:

1. A device for puncturing an aerosol can having a base, comprising:

a receiver member defining a seat for receiving the aerosol can with its base downward against the seat, the receiver member being formed with a passage extending downward from the seat, a pivot rod fitted in the receiver member below the seat, a tool bit attached to the pivot rod and projecting from the pivot rod into the passage, such that when the pivot rod is rotated in a first sense a tip of the tool bit moves upward along an arcuate path from a relatively withdrawn position in which the can can be placed on the seat over the passage without interference with the tool bit, to a relatively extended position in which the tool bit extends upward of the seat and penetrates the base of the can.

2. A device according to claim 1, for puncturing an aerosol can having a rim surrounding its base, wherein the receiver member includes a means for engaging the rim and limiting movement of the can away from the seat.

3. A device according to claim 1, comprising a track connected to the receiver member and sloping upward therefrom for receiving a punctured can, the track defining a channel for allowing liquid from the can to flow downward toward the passage in the receiver member.

4. A device according to claim 1, wherein the pivot rod is in two parts which are connected together by the tool bit.

5. A device according to claim 1, wherein the pivot rod has two opposite ends which project from the receiver member at opposite respective sides thereof.

6. A device according to claim 5, further comprising a handle, and wherein each end of the pivot rod includes a means for releasably attaching the handle to the pivot rod, to facilitate operation of the device by either a left-handed operator or a right-handed operator.

7. A device according to claim 1, further comprising an adaptor member for attaching the receiver member to a container for receiving liquid that drains from the punctured can and passes downward through the passage in the receiver member, the adaptor member being a tube which is fitted coaxially in the passage in the receiver member.

* * * * *